(12) United States Patent
Spieth

(10) Patent No.: US 8,745,977 B2
(45) Date of Patent: Jun. 10, 2014

(54) MASS DAMPER

(75) Inventor: Arnulf Spieth, Hochdorf (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 263 days.

(21) Appl. No.: 13/104,164

(22) Filed: May 10, 2011

(65) Prior Publication Data

US 2011/0277455 A1 Nov. 17, 2011

(30) Foreign Application Priority Data

May 11, 2010 (DE) .......................... 10 2010 020 032

(51) Int. Cl.
*F01N 1/00* (2006.01)
(52) U.S. Cl.
USPC .................... 60/322; 60/272; 60/274; 60/275; 60/321; 267/140.14; 267/140.15
(58) Field of Classification Search
USPC ................... 60/272, 274, 275, 312, 322, 324; 267/140.14, 140.15
See application file for complete search history.

(56) References Cited

U.S. PATENT DOCUMENTS

| 3,574,358 | A | * | 4/1971 | Cassel ............................. 285/53 |
| 4,565,940 | A | | 1/1986 | Hubbard, Jr. |
| 5,241,512 | A | * | 8/1993 | Argy et al. ......................... 367/1 |
| 6,009,985 | A | | 1/2000 | Ivers |
| 6,134,964 | A | | 10/2000 | Jaenker et al. |
| 6,315,277 | B1 | * | 11/2001 | Nagasawa ................. 267/140.14 |
| 6,439,556 | B1 | * | 8/2002 | Baudendistel et al. .. 267/140.15 |
| 6,854,721 | B2 | * | 2/2005 | Kato et al. .................. 267/140.4 |
| 7,134,704 | B2 | | 11/2006 | Fischer |
| 7,876,024 | B2 | | 1/2011 | Melz et al. |
| 7,971,850 | B2 | * | 7/2011 | Heim et al. ............... 251/129.06 |
| 2011/0232986 | A1 | * | 9/2011 | Nording et al. ................ 180/309 |

FOREIGN PATENT DOCUMENTS

| DE | 195 24 948 A1 | 2/1996 |
| DE | 197 39 877 A1 | 3/1999 |
| DE | 102004013342 B3 | 9/2005 |
| DE | 102004046150 A1 | 3/2006 |
| DE | 102004062471 B3 | 5/2006 |
| DE | 102007039548 B3 | 1/2009 |

* cited by examiner

*Primary Examiner* — Binh Q Tran
(74) *Attorney, Agent, or Firm* — McGlew and Tuttle, P.C.

(57) ABSTRACT

A mass damper method includes providing an electroactive polymer (7) and using the electroactive polymer (7) to manufacture a mass damper (6). The mass damper (6) for damping a vibrating system of a motor vehicle includes at least one of a damping body (10) forming a countervibrating mass with a damping spring (11) and a springy damping body (10) forming the countervibrating mass. The damping body (10) is indirectly or directly coupled with the vibrating system. The springy damping body (10) or the damping spring (11) includes an electroactive polymer (7). A motor vehicle exhaust system of an internal combustion engine is provided including an exhaust gas line (3) with an exhaust pipe (4), an exhaust gas-treating device (5) integrated in the exhaust pipe and the mass damper (6) coupled with the exhaust gas line.

20 Claims, 2 Drawing Sheets

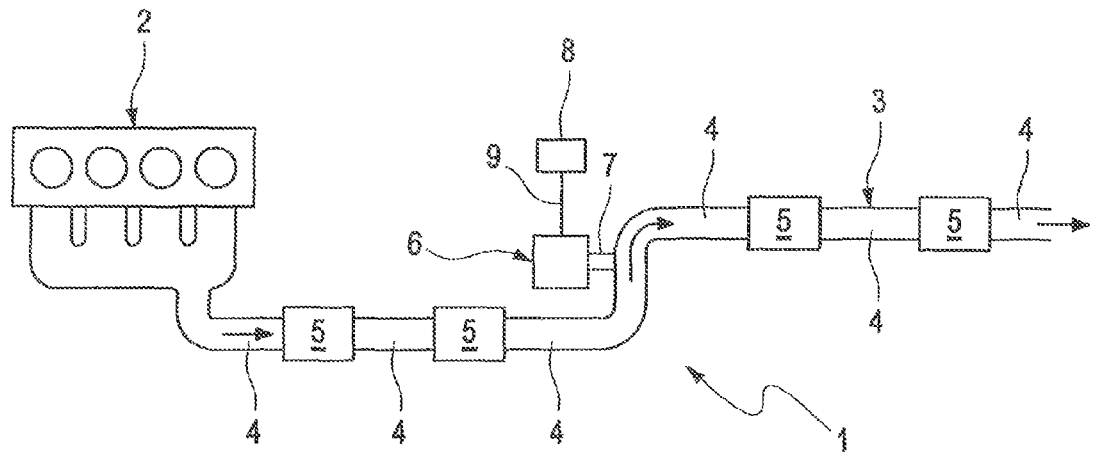
Fig. 1
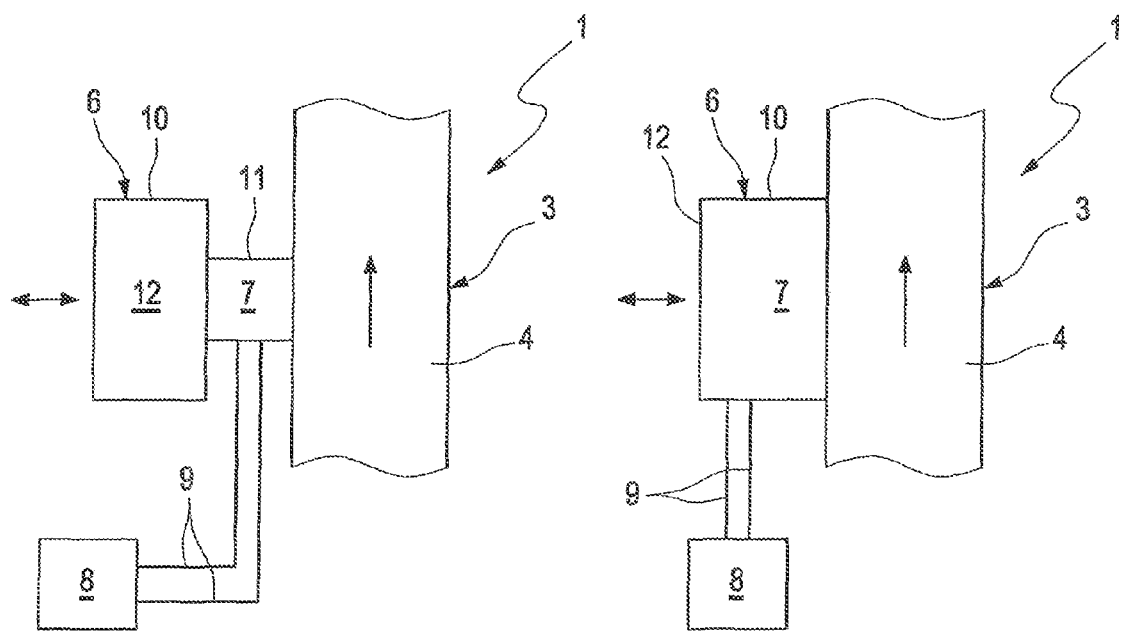
Fig. 2
Fig. 3

MASS DAMPER

CROSS REFERENCE TO RELATED APPLICATIONS

This application claims the benefit of priority under 35 U.S.C. §119 of German Patent Application DE 10 2010 020 032.8 filed May 11, 2011, the entire contents of which are incorporated herein by reference.

FIELD OF THE INVENTION

The present invention pertains to the damping of vibrations in a vibrating system, for example, in an exhaust system of an internal combustion engine. The present invention pertains, furthermore, to the a mass damper method that uses an electroactive polymer, a mass damper and an exhaust system with the mass damper.

BACKGROUND OF THE INVENTION

A mass damper or damper for short, damps vibrations in a vibrating system by having as the central active element a vibrating mass of its own, which vibrates opposite the vibration of the vibrating main object of the vibrating system. The vibrating mass of the damper may also be called countervibrating mass, because it vibrates in antiphase to the exciting vibration of the vibrating system. The countervibrating mass or damping mass forms, together with a damping spring, a physical pendulum, whose resonant frequency is set at a certain ratio to the vibration frequency of the vibrating system, which such vibration frequency is to be damped. The damper can perform great deflections at this resonant frequency and extract vibration energy from the vibrating structure to be damped for its own vibration motions. A mass damper is called "tuned mass damper" or "active mass damper or "harmonic absorber" in the English usage.

Mass dampers are frequently used when so-called "resonance catastrophes" are to be prevented in the vibrating system. A resonance catastrophe develops when the vibrating system has a resonant frequency and is induced to perform vibrations in the range of the resonant frequency. The vibration amplitudes may grow in this case to unacceptably high values or "build up." As a consequence, disintegration of the vibrating system may occur. If the mass damper is tuned exactly to this resonant frequency of the vibrating system, very much vibration energy is extracted from the vibrating system in the range of the resonant frequency, as a result of which the vibration amplitudes can be significantly reduced. If the vibrating system has more than one critical resonant frequency, a plurality of differently tuned mass dampers must be correspondingly provided. The effort needed for this is comparatively great. Furthermore, the mass dampers may mutually hinder each other concerning their function due to their being connected to the vibrating system.

SUMMARY OF THE INVENTION

The basic object of the present invention is to provide an improved embodiment for a mass damper or for an exhaust system equipped therewith, which embodiment is characterized especially in that more than one vibration frequency can be damped.

According to the invention, a mass damper method is provided including the steps of providing an electroactive polymer and using the electroactive polymer to manufacture a mass damper.

According to another aspect of the invention, a mass damper is provided for damping a vibrating system of a motor vehicle. The mass damper includes at least one of a damping body forming a countervibrating mass with a damping spring and a springy damping body forming the countervibrating mass. The damping body is indirectly or directly coupled with the vibrating system. The springy damping body or the damping spring includes an electroactive polymer.

According to another aspect of the invention a motor vehicle exhaust system of an internal combustion engine is provided including an exhaust gas line with an exhaust pipe, an exhaust gas-treating device integrated in the exhaust pipe and the mass damper coupled with the exhaust gas line.

The present invention is based on the general idea of using an electroactive polymer to manufacture such a mass damper. Electroactive polymers are polymers which change their shape due to the application of an electric voltage. They may be used, for example, as actors for performing motions or as sensors for detecting motions. Distinction is made between ionic electroactive polymers and electronic electroactive polymers. In ionic electroactive polymers, the mechanism of action is based on mass transport, especially diffusion, of ions. Subgroups of such ionic electroactive polymers are conductive polymers, ionic metal-polymer composites and ionic gels. Contrary to this, the mode of action of electronic electroactive polymers is based on electronic charge transport. Electrostrictive and ferroelectric polymers as well as dielectric elastomers can be classified to this group.

The present invention utilizes the discovery that the stiffness or springiness of the polymer can be varied by applying a voltage to the electroactive polymer. With respect to a mass damper with electroactive polymer, this means that the springiness of the polymer can be varied by applying an electric voltage to the electroactive polymer and the resonant frequency of the mass damper can thus be varied. In particular, it is possible as a result to damp different frequencies with the same mass damper. Particularly advantageous here is the circumstance that the particular mass damper has only a single coupling site with the vibrating system, as a result of which interactions, which may occur in case of the use of two or more different mass dampers, which are connected to the vibrating system at two or more different sites, can be avoided.

Corresponding to an advantageous embodiment, the mass damper may have at least one damping body forming a countervibrating mass and a damping spring, wherein said damping spring is formed entirely or at least in one section from the electroactive polymer. As an alternative, the mass damper may have at least one springy damping body, which forms a countervibrating mass and is formed entirely or at least partly from the electroactive polymer. Two different modes of construction of the mass damper with electroactive polymer are thus distinguished. In one mode of construction, the mass damper conventionally comprises a damping body forming the countervibrating mass and, in addition to this, a damping spring for coupling the body with the vibrating system. The damping spring is made at least partly from the electroactive polymer in this case in order to change the spring rate and hence the resonant frequency of the mass damper by means of the electric voltage applied to the electroactive polymer. The mass damper is formed in the other mode of construction by a damping body, which again forms the countervibrating mass, but is springy itself in this case and is formed at least partly from the electroactive polymer. In other words, the damping spring and countervibrating mass are designed integrally in the damping body in this mode of construction. By varying the electric voltage present on the electroactive polymer, the springiness and hence the resonant frequency of the mass damper can also be changed according to the invention.

The use of the electroactive polymer in the mass damper can now be preferably modified such that a resonant frequency of the mass damper can be set depending on an electric voltage applied to the electroactive polymer. Different damping frequencies, at which the mass damper extracts a significant quantity of vibration energy from the vibrating system, can thus be embodied with a single mass damper.

Especially advantageous here is an embodiment in which an electric control means is provided, which actuates the electroactive polymer for setting a resonant frequency of the mass damper as a function of at least one input variable. For example, the vibration frequency of the exhaust system, i.e., of the vibrating system, changes with the rpm of the internal combustion engine in an exhaust system of an internal combustion engine. If this vibration frequency reaches the frequency range of a first resonant frequency, the resonant frequency of the mass damper can be set to this first resonant frequency by means of the control means. If the vibration excitation of the exhaust system reaches a second resonant frequency at another rpm of the internal combustion engine, the resonant frequency of the mass damper can now be tuned to this other resonant frequency by means of the electric control means. It is likewise possible to design the mass damper such that in the unenergized state it has a resonant frequency that is used to damp a typical resonant frequency of the vibrating system. A suitable adaptation of the resonant frequency of the mass damper can then be achieved to damp another frequency or resonant frequency that deviates therefrom by applying a corresponding voltage.

Corresponding to another embodiment, the electroactive polymer can be electrically excited to perform vibrations, so that an active mass damper can be embodied. By means of an active mass damper, vibrations can also be damped significantly outside the resonant frequency of the mass damper in the vibrating system by means of actively generated countervibrations of the opposing mass by extracting energy from the system by means of the countervibrations. Provisions may now be made, for example, to always reduce the frequency with the greatest amplitude in the current frequency band of the vibrations of the vibrating system by generating active countervibrations tuned in this respect. It is also conceivable to modulate the vibrations of the countervibration such that a plurality of countervibration motions are simultaneously superimposed in order to thus make it possible to damp simultaneously a plurality of different vibration frequencies of the vibrating system.

Thus, the present invention also especially pertains to a mass damper for damping a vibrating system, especially a motor vehicle, which has at least one damping body, which can be indirectly or directly coupled with the vibrating system. The damping body may itself be made at least partly from the electroactive polymer or have a damping spring for the indirect coupling of the damping body with the vibrating system, which is made at least partly from the electroactive polymer. This mass damper may now, according to the invention be designed as an adjustable mass damper, whose resonant frequency can be set depending on an electric voltage applied to the particular electroactive polymer. The mass damper may also be designed as an active mass damper, which can be excited to perform natural vibrations depending on electric voltages and/or electric voltage pulses applied to the particular electroactive polymer.

A control means used for this purpose may be electrically connected to at least one vibration sensor, which is in turn coupled with the vibrating system such that it can detect vibrations thereof. The control means varies the resonant frequency of the (passive) mass damper depending on the detected vibrations or actuates the (active) mass damper to generate suitable, counteracting natural vibrations. In addition or as an alternative, the control means may be electrically coupled with an engine control device and tap the current rpm of the internal combustion engine therefrom. The control means may then vary the resonant frequency of the mass damper or actuate the mass damper to perform natural vibrations as a function of this rpm.

In an especially advantageous embodiment, the mass damper may have at least two damping bodies, which are arranged at a common carrier such that they are able to vibrate, said carrier being able to be rigidly connected to the vibrating system. At least one of these damping bodies or a corresponding damping spring is made at least partly from the electroactive polymer. Due to this mode of construction, different damping frequencies can be obtained in the same mass damper, and at least one of these damping frequencies is, moreover, variable.

It may be appreciated that the above-mentioned features, which will also be explained below, can be used not only in the particular combination indicated, but in other combinations or alone as well without going beyond the scope of the present invention. Preferred exemplary embodiments of the present invention are shown in the drawings and will be explained in more detail below, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a highly simplified schematic view of an exhaust system;

FIG. 2 is a highly simplified schematic view of a mass damper;

FIG. 3 is a highly simplified schematic view of another mass damper; and

DESCRIPTION OF THE PREFERRED EMBODIMENTS

Figure 4:
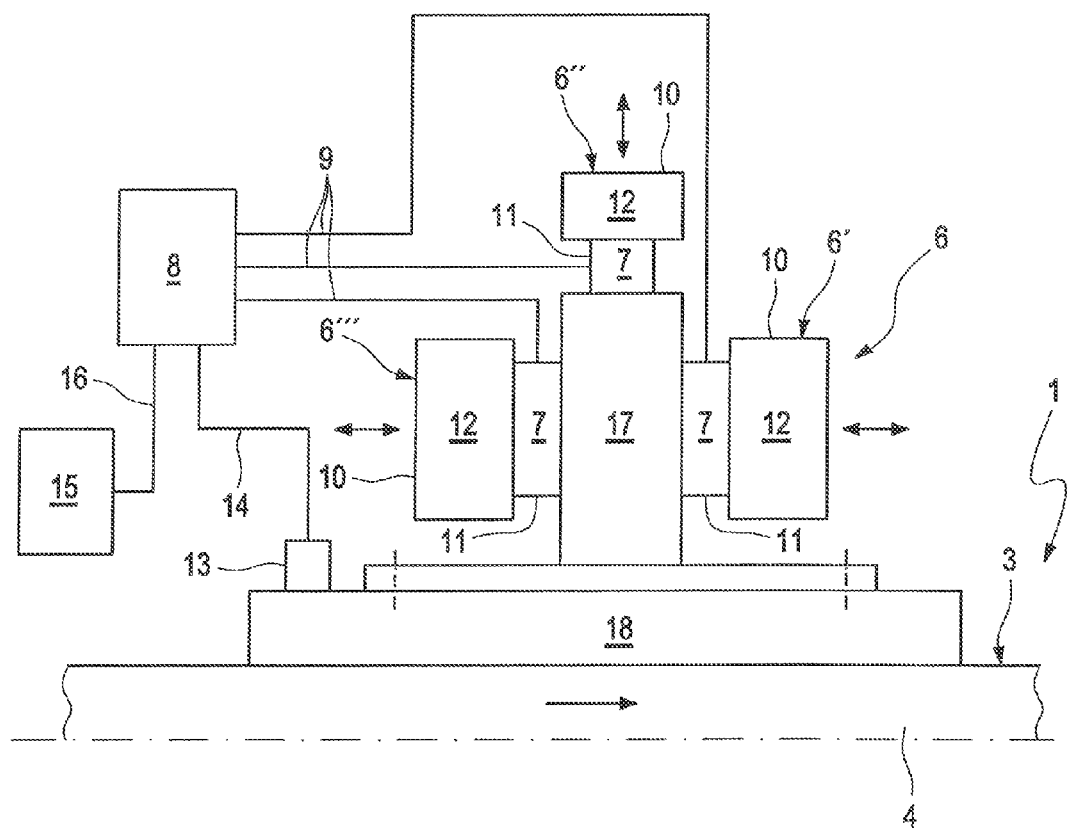
FIG. 4 is a highly simplified schematic view of another mass damper.

Referring to the drawings in particular, corresponding to FIG. 1, an exhaust system 1 of an internal combustion engine 2, which may be preferably arranged in a vehicle, comprises an exhaust gas line 3 with at least one exhaust pipe 4 and at least one exhaust gas-treating means 5, which is integrated into the exhaust pipe 4. A plurality of exhaust gas-treating means 5 are shown in the example. Such an exhaust gas-treating means 5 may be, e.g., a catalytic converter, a particle filter or an exhaust muffler or any desired combination thereof. A corresponding exhaust gas flow is indicated by a direction arrow in FIGS. 1-4.

The exhaust system 1 forms a system capable of vibrating or vibrating system, which can hereinafter likewise be designated by 1 and which is excited to perform vibrations during the operation of the internal combustion engine 2. To damp these vibrations, at least one mass damper 6 is provided, which is coupled with the exhaust gas line 3. This mass damper 6 has an electroactive polymer 7, to which an electric voltage can be applied by means of a control means 8 via corresponding control lines 9. The resonant frequency of the mass damper 6 can be varied as a result. It is likewise possible to operate the mass damper 6 as an active mass damper 6 by a corresponding actuation of the electroactive polymer 7.

Corresponding to FIG. 2, the mass damper 6 may have at least one damping body 10 and a damping spring 11. Damping body 10 forms a countervibrating mass 12 and damping spring 11 is used to couple the mass damper 6 with the vibrating system 1, i.e., with the exhaust system 1 here. In the example according to FIG. 2, the damping spring 11 is formed entirely or at least partly, i.e., at least in one section, from the electroactive polymer 7. The control means 8 is correspondingly connected to the damping spring 11 via the control lines 9 here.

FIG. 3 shows another embodiment of the mass damper 6, which again has a damping body 10, which again forms the countervibrating mass 12, but is springy in this case and is itself formed entirely or at least partly from the electroactive polymer 7. The function of the countervibrating mass 12 and of the damping spring 11 is thus integrated in this embodiment in the damping body 19, whereas the damping spring 11 is designed as a separate spring from the damping body 10 in the embodiment shown in FIG. 2.

The mass damper 6 shown here can be operated as a passive mass damper 6 with a resonant frequency that can be set during the operation. The countervibrating mass 12 is excited to perform vibrations by the vibrations of the vibrating system 1 in case of such a passive mass damper 6, which is indicated by double arrows in FIGS. 2-4. The damper 6 has a resonant frequency at which the countervibrating mass 12 vibrates opposite the vibrations of the vibrating system 1 and effectively extracts vibration energy from the vibrating system 1 as a result. This resonant frequency of the mass damper 6 can now be set or varied depending on an electric voltage applied to the electroactive polymer 7 by means of the control means 8. Correspondingly adapted resonant frequencies can thus be set at the damper 7 for different vibration excitations within the vibrating system 1 in order to make it possible to damp different frequencies of the vibrating system 1 as desired. For example, the control means 8 can actuate the electroactive polymer 1 as a function of an input variable to set a resonant frequency of the mass damper 6.

The mass damper 6 shown here can also be operated as an active mass damper 6 with a countervibration frequency that can be set during the operation. The active mass damper 6 is provided with the control means 8 electrically exciting the electroactive polymer 7 or the countervibrating mass 12 of the damper 6 to perform vibrations. It is thus also possible outside the resonant frequency of the mass damper 6, in particular, to generate vibrations of the countervibrating mass, which introduce energy into the exhaust system 1 or into the corresponding vibrating system 1 in antiphase, doing so in a phase-shifted manner in relation to a vibration frequency to be damped such that the vibrations of the vibrating system 1 will be reduced and especially extinguished.

For example, the control means 8 according to FIG. 4 is electrically connected to at least one vibration sensor 13, for example, via a signal line 14. This vibration sensor 13 is coupled with the system 1 in a suitable manner and detects the vibrations of the vibrating system 1. The control means 8 is used to detect vibrations as an input variable, as a function of which the control 8 actuates the mass damper 6. The actuation of the mass damper 6 then takes place such that the resonant frequency of the mass damper 6 varies and/or the mass damper 6 or its countervibrating mass 12 is excited to perform natural vibrations.

In addition or as an alternative, the control means 8 according to FIG. 4 may be electrically connected to an engine control device 15, for example, via a signal line 16. The engine control device 15 is used in the usual manner to actuate the internal combustion engine 2 and usually is feed or knows the current rpm of the internal combustion engine 2. The control means 8 can now poll this rpm from the engine control device 15 and use it as an input variable for actuating the mass damper 6. This embodiment is based on the consideration that the vibrations of the exhaust system 1 are closely correlated with the rpm of the internal combustion engine 2.

In the embodiment shown in FIG. 4, the damper 6 has a carrier 17, which is rigidly connected to the vibrating system 1. For example, the carrier 17 is flanged onto a bracket 18, which is in turn arranged rigidly at the exhaust pipe 4 or at the exhaust gas line 3. The carrier 17 thus vibrates in unison with the exhaust pipe 4 or with the exhaust gas line 3. The mass damper 6 has at least two damping bodies 10 in this embodiment. A total of three such damping bodies 10 are provided in the example. These damping bodies 10 are arranged together at the carrier 17 and such that they are able to vibrate each in themselves. At least one of these damping bodies 10 or at least one corresponding damping spring 11 is made entirely or at least partly from the electroactive polymer 7. Each damping body 10 is arranged in the example being shown at the common carrier 17 such that they are able to vibrate. Furthermore, the damping springs 11 are formed at least partly from the electroactive polymer 7 in the example. The electroactive polymers 7 are connected here to the common control means 8. This means that the control means 8 can actuate or operate the electroactive polymers 7 together or one by one.

The three damping bodies 10 form a countervibrating mass 12 each here, which may preferably be dimensioned differently. In addition, they may be arranged at the carrier 17 such that they vibrate in different directions. Vibration directions extending at right angles to one another are preferably embodied here. Moreover, the individual damping springs 11 may be of different designs.

The respective damping body 10 forms a partial mass damper 6', 6", 6'" with the corresponding damping spring 11, so that a total of three such partial mass dampers 6', 6", 6'" are embodied within the mass damper 6 in the example according to FIG. 4. These partial mass dampers 6', 6", 6'" may differ from each other by different natural frequencies.

The control means 8 can apply electric voltages to the damping springs 11 as a function of the vibrations generated in the vibrating system 1, which are to be damped, in order to make it possible to individually set or adapt the resonant frequency of at least one of the partial mass dampers 6', 6", 6'". Moreover, the control means 8 can operate at least one of these partial mass dampers 6', 6", 6'" as an active partial mass damper 6', 6", 6'". The corresponding countervibrating mass 12 is actuated for this by means of electric voltages and/or electric voltage pulses, which are applied to the electroactive polymer 7 of the corresponding damping spring 11, to generate the suitable countervibrations.

While specific embodiments of the invention have been shown and described in detail to illustrate the application of the principles of the invention, it will be understood that the invention may be embodied otherwise without departing from such principles.

What is claimed is:

1. A mass damper for damping a vibrating system of a motor vehicle, the mass damper comprising:

at least one of a damping body forming a countervibrating mass with a damping spring and a springy damping body forming the countervibrating mass, said damping body being indirectly or directly coupled with the vibrating system, said springy damping body or said damping spring comprising an electroactive polymer, wherein the vibrating system of the motor vehicle is an exhaust system of an internal combustion engine, the exhaust system comprising an exhaust gas line with an exhaust pipe and an exhaust gas-treating means integrated in said exhaust pipe;

an electric control means electrically connected to said electroactive polymer for actuating said electroactive polymer to set a resonant frequency of the mass damper and/or to generate natural vibrations of the mass damper as a function of an input variable received by said electric control means such that vibration of said exhaust system is reduced via said resonant frequency of said mass damper and/or said natural vibrations of said mass damper.

2. A mass damper in accordance with claim 1, wherein said control means is at least one of:
electrically connected to at least one vibration sensor coupled with the vibrating system and detects the vibrations thereof, wherein said control means uses the detected vibrations as said input variable to actuate the mass damper; and
electrically connected to an engine control device for actuating an internal combustion engine and obtains from the engine control device a current rpm of the internal combustion engine, wherein said control means uses the rpm obtained as an input variable to actuate the mass damper.

3. A mass damper in accordance with claim 1, further comprising a common carrier wherein at least two damping bodies are provided, which are arranged at said common carrier so as to vibrate, said common carrier being rigidly connectable to the vibrating system, wherein at least one of said damping bodies or a corresponding said damping spring is formed at least partly from said electroactive polymer.

4. A mass damper in accordance with claim 3, wherein both of said at least two damping bodies or damping springs thereof comprise said electroactive polymer, wherein said electroactive polymer of both of said at least two damping bodies or damping springs thereof is actuated via said control means as a common control means.

5. A mass damper in accordance with claim 1, wherein the mass damper is a part of a passive mass damper having a resonant frequency set depending on an electric voltage applied to said electroactive polymer.

6. A mass damper in accordance with claim 1, wherein the mass damper is a part of an active mass damper excited to perform natural vibrations depending on at least of electric voltage pulses, electric vlotages and electric voltage applied to said electroactive polymer.

7. A motor vehicle exhaust system of an internal combustion engine, the exhaust system comprising:
an exhaust gas line with an exhaust pipe;
an exhaust gas-treating means integrated in said exhaust pipe;
a mass damper coupled with the exhaust gas line, the mass damper comprising:
at least one of a damping body forming a countervibrating mass with a damping spring and a springy damping body forming the countervibrating mass, said damping body being indirectly or directly coupled with at least the exhaust gas line, said springy damping body or said damping spring comprising an electroactive polymer;
an electric control means electrically connected to said electroactive polymer for actuating said electroactive polymer to set a resonant frequency of the mass damper and/or to generate natural vibrations of the mass damper as a function of an input variable received by said electric control means, wherein vibration in at least said exhaust gas line is dampened via said resonant frequency and/or said natural vibrations.

8. A motor vehicle exhaust system in accordance with claim 7, wherein said control means is at least one of:
electrically connected to at least one vibration sensor coupled with at least said exhaust gas line and detects the vibrations thereof, wherein said control means uses the detected vibrations as said input variable to actuate the mass damper; and
electrically connected to an engine control device for actuating an internal combustion engine and obtains from the engine control device a current rpm of the internal combustion engine, wherein said control means uses the rpm obtained as an input variable to actuate the mass damper.

9. A motor vehicle exhaust system in accordance with claim 7, further comprising a common carrier wherein at least two damping bodies are provided, which are arranged at said common carrier so as to vibrate, said common carrier being rigidly connectable to the vibrating system, wherein at least one of said damping bodies or a corresponding said damping spring is formed at least partly from said electroactive polymer.

10. A motor vehicle exhaust system in accordance with claim 9, wherein both of said at least two damping bodies or damping springs thereof comprise said electroactive polymer, wherein said electroactive polymer of both of said at least two damping bodies or damping springs thereof is actuated via said control means as a common control means.

11. A motor vehicle exhaust system in accordance with claim 7, wherein the mass damper is a part of a passive mass damper having a resonant frequency set depending on an electric voltage applied to said electroactive polymer.

12. A motor vehicle exhaust system accordance with claim 7, wherein the mass damper is a part of an active mass damper excited to perform natural vibrations depending on at least of electric voltage pulses, electric voltages and electric voltage applied to said electroactive polymer.

13. A motor vehicle exhaust system accordance with claim 7, wherein said damping body is connected to said exhaust gas line at a single coupling site of said exhaust gas line.

14. A motor vehicle exhaust system accordance with claim 7, wherein one of said damping spring and said springy damping body is in direct contact with said exhaust gas line.

15. A motor vehicle exhaust system accordance with claim 9, wherein said control means control each of said damping bodies such that each of said damping bodies vibrate in different directions, one of said different directions being perpendicular to another one of said different directions.

16. A mass damper in accordance with claim 1, wherein said damping body is connected to said vibrating system at a single coupling site of said vibrating system.

17. A mass damper in accordance with claim 3, wherein said control means control each of said damping bodies such that each of said damping bodies vibrate in different directions, one of said different directions being perpendicular to another one of said different directions.

18. A motor vehicle exhaust system of an internal combustion engine, the exhaust system comprising:
- a vibrating system comprising an exhaust gas line with an exhaust pipe and an exhaust gas-treating means integrated in said exhaust pipe;
- a mass damper coupled with at least the exhaust gas line, the mass damper comprising:
    - at least one of a damping body forming a countervibrating mass with a damping spring and a springy damping body forming the countervibrating mass, said damping body being indirectly or directly coupled with at least said exhaust gas line, said springy damping body or said damping spring comprising an electroactive polymer;
- a vibration sensor connected to at least said exhaust gas line, said vibration sensor detecting at least exhaust gas line vibration of said at least said exhaust gas line;
- an electric control device electrically connected to said electroactive polymer, said electric control device being connected to said vibration sensor, said electric control device receiving at least said exhaust gas line vibration as input and actuating said electroactive polymer to set a resonant frequency of the mass damper and/or to generate natural vibrations of the mass damper based on at least said exhaust system vibration, wherein said exhaust system vibration is dampened via said resonant frequency and/or said natural vibrations.

19. A motor vehicle exhaust system accordance with claim 18, wherein said damping body is connected to said at least said exhaust gas line at a single coupling site of said at least said exhaust gas line.

20. A motor vehicle in accordance with claim 18, wherein said control means is electrically connected to an engine control device for actuating an internal combustion engine and obtains from the engine control device a current rpm of the internal combustion engine, wherein said control means uses the rpm obtained as an input variable to actuate the mass damper.

* * * * *